United States Patent Office 3,651,158
Patented Mar. 21, 1972

3,651,158
MOLYBDENUM-ANTIMONY HYDROGENATION CATALYST
Donald C. Tabler, Bartlesville, Okla., assignor to Phillips Petroleum Company
No Drawing. Filed June 25, 1970, Ser. No. 49,992
Int. Cl. C07c 5/10
U.S. Cl. 260—667　　　　　　　　　　　　　8 Claims

ABSTRACT OF THE DISCLOSURE

A method is disclosed for the hydrogenation of aromatics to naphthenes employing a supported molybdenum-antimony catalyst.

---

This invention relates to hydrogenation.

In one of its more specific aspects, this invention relates to a molybdenum-antimony catalyst particularly suitable for hydrogenating aromatics to naphthenes.

From time to time, due to prevailing commercial demands, the supply of any one organic chemical may vary considerably. Hence, any catalyst or chemical process which can be feasibly employed to satisfy peak demands will find important usage. This is particularly true in respect to the present catalyst and process which can be employed, for example, in hydrogenating benzene to cyclohexane.

In general, the catalyst of this invention comprises a supported molybdenum-antimony catalyst.

According to this invention there is provided a process for the hydrogenation of aromatics to naphthenes which comprises contacting a feedstock comprising the aromatic with a supported molybdenum-antimony catalyst and with hydrogen under hydrogenation conditions and recovering the naphthenes produced.

The method of this invention is applicable to the conversion of numerous aromatics to their corresponding naphthenes, including the conversion of benzene to cyclohexane, toluene to methylcyclohexane, and xylenes to dimethylcyclohexanes. In general, the catalyst and method of this invention are applicable to the hydrogenation of aromatics whose alkyl chains are no more than 4 carbon atoms long.

The following discussion will be limited to the hydrogenation of benzene to cyclohexane. However, the invention is not to be considered as being limited thereto in respect to either its catalyst or its process.

Accordingly, it is an object of this invention to provide an efficient catalyst and process for converting aromatic hydrocarbons to naphthenic hydrocarbons.

This and other objects of this invention will be evident from the following disclosure.

Specifically, the catalyst of this invention comprises molybdenum and antimony on a support, the molybdenum being present in an amount from about 3 to about 15 weight percent of the catalyst, the antimony being present in such an amount that the molybdenum to antimony mole ratio is from about 2 to about 6.

The catalyst can be prepared by mixing solutions of a molybdate salt and an antimony salt, impregnating the support with the mixture to form a paste, neutralizing and drying the paste and calcining the resulting solids to produce the catalyst. Suitable supports include α-alumina, γ-alumina, silica, calcium aluminate and magnesium oxide and the like.

EXAMPLE I

A catalyst comprising about 8.1 weight percent molybdenum and about 4.7 weight percent antimony on alumina was prepared according to the following procedure.

Fourteen and eight-tenths grams (14.8 g.) of ammonium molybdate [$(NH_4)_6Mo_7O_{24} \cdot 4H_2O$)] were dissolved in 250 ml. of water. The solution was chilled and to it were added 8 ml. (18.8 g.) of antimony pentachloride.

To the solution, 70 g. of Alon-C alumina were added to form a paste upon mixing. The paste was neutralized to a pH of about 8 employing 33 ml. of 28 percent ammonium hydroxide. The neutralized paste was dried for about 16 hours at 70° F. The dried paste was then heated in contact with air at a temperature of 600° F. for 3 hours, then at 1000° F. for 1 hour. The resulting solid was crushed to 10 to 35 mesh, and analyzed to be 8.1 weight percent of molybdenum, 4.7 weight percent antimony and the balance alumina. This material was then reduced in a stream of hydrogen at about 800° F. for about 16 hours.

The catalyst of this invention can also be prepared by ball-milling stoichiometric amounts of antimony oxide and molybdenum oxide with spray-dried alumina gel for a period of time to effect incorporation into the gel, and then pelleting the mixture.

Another method involves the formation of the antimonyl tartrate by dissolving antimony oxide in a solution containing tartaric acid and nitric acid. In the solution containing the antimonyl tartrate, ammonium molybdate is dissolved and the solution is then employed to impregnate the support, preferably alumina gel, which is thereafter dried, calcined, pelleted and reduced in hydrogen.

The method of this invention is carried out by contacting the catalyst with the aromatic and with hydrogen. The aromatic is preferably diluted in an inert carrier such as pentane, hexane, cyclohexane or the hydrogenated product from the reaction, for the purpose of absorbing the heat of reaction. Preferably, the diluent is any saturated hydrocarbon having a boiling point differing by about 30 to 40° F. from that of the naphthene formed. The preferred concentration of the aromatic to be hydrogenated in the diluent is from about 5 to about 50 weight percent.

The reaction will be conducted at a temperature of about 400° F. to about 650° F., at a pressure of from about 100 p.s.i.g. to about 1000 p.s.i.g., at a feed rate, that is, aromatic plus diluent, of about 0.5 to about 15 LHSV and at a hydrogen to aromatic mole ratio of from about 2 to about 40.

EXAMPLE II

The following series of runs was carried out employing that catalyst whose preparation was described in Example I. In all instances the benzene was diluted in n-pentane, the mixture being comprised of 20 volume percent benzene and 80 volume percent n-pentane.

Operating conditions and results were as follows:

| Run Number | 1 | 2 | 3 | 4 | 5 |
|---|---|---|---|---|---|
| Temperature, °F | 560 | 579 | 582 | 588 | 591 |
| Pressure, p.s.i.g | 600 | 800 | 800 | 800 | 800 |
| Hydrogen to benzene mole ratio | 2.0 | 13 | 23 | 27 | 32 |
| Liquid feed rate, LHSV | 1 | 1 | 1 | 1 | 1 |
| Product analysis, wt. percent (pentane free basis): | | | | | |
| Cyclohexane | 31.8 | 58.3 | 85.5 | 90.3 | 97.9 |
| Benzene | 67.3 | 46.2 | 14.5 | 9.7 | 2.1 |

The above data indicate the operability of the catalyst and method of this invention. They further indicate substantial conversion of benzene to cyclohexane, particularly at the higher hydrogen to benzene mole ratios.

It will be appreciated that various modifications can be made to the catalyst and method of this invention. However, such are considered as being within the scope of the invention.

What is claimed is:

1. A method of hydrogenating an aromatic hydrocarbon to produce naphthenes which comprises passing said aromatic hydrocarbon and hydrogen into contact with a supported molybdenum-antimony catalyst and recovering the naphthene product, said antimony being present in said catalyst in an amount within the range of from about 3 to about 15 weight percent of said catalyst and said antimony being present in an amount to provide a molybdenum to antimony mole ratio of from about 2 to about 6.

2. The method of claim 1 in which said aromatic hydrocarbon comprises a compound selected from the group consisting of benzene, toluene and xylene.

3. The method of claim 2 in which said benzene is contained in a diluent comprising a saturated hydrocarbon, said benzene being contained in said diluent in an amount within the range of from about 5 to about 50 weight percent.

4. The method of claim 3 in which said benzene and hydrogen are passed into contact with said catalyst at a temperature of from about 400° F. to about 650° F., at a pressure of from about 100 p.s.i.g. to about 1000 p.s.i.g., at a rate of about 0.5 to about 15 LHSV based upon the total of said diluent and said benzene and at a hydrogen to benzene mole ratio of from about 2 to about 40.

5. The method of claim 4 in which said diluent comprises n-pentane, 20 parts by weight of benzene being contained in 80 parts by weight of said n-pentane.

6. The method as defined in claim 5 in which said temperature is about 590° F., said pressure is about 800 p.s.i.g., said hydrogen to benzene mole ratio is about 32, and at a liquid feed rate of about 1 LHSV.

7. The method of claim 2 in which said aromatic hydrocarbon is contained in a diluent comprising a saturated hydrocarbon, said aromatic hydrocarbon being contained in said diluent in an amount within the range of from about 5 to about 50 weight percent.

8. The method of claim 2 in which said aromatic hydrocarbon and hydrogen are passed into contact with said catalyst at a temperature of from about 400° F. to about 650° F., at a pressure of from about 100 p.s.i.g. to about 1000 p.s.i.g., at a rate of about 0.5 to about 15 LHSV based upon the total of said diluent and said aromatic hydrocarbon and at a hydrogen to aromatic hydrocarbon mole ratio within the range of from about 2 to about 40.

References Cited
UNITED STATES PATENTS

| | | | |
|---|---|---|---|
| 2,635,081 | 4/1953 | Mills et al. | 260—667 |
| 2,649,419 | 8/1953 | Johnson et al. | 260—667 |
| 2,735,877 | 2/1956 | Mills et al. | 260—667 |
| 2,821,561 | 1/1958 | Pevere et al. | 260—667 X |
| 3,110,747 | 11/1963 | Mullineaux | 260—667 |

DELBERT E. GANTZ, Primary Examiner

V. O'KEEFE, Assistant Examiner

U.S. Cl. X.R.

208—143; 260—666 P